United States Patent
Morita et al.

(10) Patent No.: US 6,855,304 B2
(45) Date of Patent: Feb. 15, 2005

(54) CATALYST AND PROCESS FOR REMOVING ORGANOHALOGEN COMPOUNDS

(75) Inventors: Atsushi Morita, Himeji (JP); Jyunichiro Kugai, Himeji (JP); Shinyuki Masaki, Himeji (JP); Noboru Sugishima, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 247 days.

(21) Appl. No.: 10/253,027

(22) Filed: Sep. 24, 2002

(65) Prior Publication Data

US 2003/0059359 A1 Mar. 27, 2003

Related U.S. Application Data

(62) Division of application No. 09/595,989, filed on Jun. 16, 2000, now abandoned.

(30) Foreign Application Priority Data

Jun. 25, 1999 (JP) .................................. 11-180933
Mar. 31, 2000 (JP) .................................... 2000-099593

(51) Int. Cl.[7] .................................... A62D 3/00
(52) U.S. Cl. .................................... 423/240 S; 588/206
(58) Field of Search .................... 423/240 R, 240 S, 423/245.1, 245.3; 588/206, 248

(56) References Cited

U.S. PATENT DOCUMENTS

| | | | |
|---|---|---|---|
| 4,102,822 A | | 7/1978 | Mulaskey |
| 4,499,203 A | | 2/1985 | Toulhoat et al. |
| 4,520,124 A | | 5/1985 | Abe et al. |
| 4,946,661 A | | 8/1990 | Tachi et al. |
| 5,137,855 A | | 8/1992 | Hegedus et al. |
| 5,292,704 A | | 3/1994 | Lester |
| 5,460,792 A | | 10/1995 | Rosenbaum |
| 5,512,259 A | | 4/1996 | Hagenmaier et al. |
| 5,658,546 A | * | 8/1997 | Kobayashi et al. ...... 423/239.1 |
| 5,877,391 A | * | 3/1999 | Kanno et al. ............... 588/205 |
| 6,121,187 A | | 9/2000 | Maier |

FOREIGN PATENT DOCUMENTS

| | | |
|---|---|---|
| EP | 0 256 359 A1 | 2/1988 |
| EP | 0 260 614 A1 | 3/1988 |
| EP | 0 415 145 A1 | 3/1991 |
| EP | 0 850 676 A1 | 7/1998 |
| JP | 5-245343 A | 9/1993 |
| JP | 6-38863 B2 | 5/1994 |
| JP | 6-205938 A | 7/1994 |
| JP | 7-163876 A | 6/1995 |
| JP | 9-75668 A | 3/1997 |
| JP | 9-103646 A | 4/1997 |
| JP | 10-235191 A | 9/1998 |
| JP | 10-235206 A | 9/1998 |
| JP | 10-323570 A | 12/1998 |
| JP | 2916259 B2 | 4/1999 |
| JP | 2000-24498 A | 1/2000 |
| JP | 2000-42409 A | 2/2000 |
| JP | 2000-61305 A | 2/2000 |
| JP | 2000-70712 A | 3/2000 |
| WO | WO 92/19366 A1 | 11/1992 |

* cited by examiner

*Primary Examiner*—Stanley S. Silverman
*Assistant Examiner*—Edward M. Johnson

(57) ABSTRACT

The present invention provides: a catalyst which has more excellent removability upon organohalogen compounds and is suitable for removing the organohalogen compounds from exhaust gases; and a process for removing organohalogen compounds with this catalyst. The catalyst for removing organohalogen compounds comprises titanium oxide ($TiO_2$) and vanadium oxide as catalytic components, and has pores that includes a group of pores having a pore diameter distribution peak in the range of 0.01 to 0.05 μm and another group of pores having a pore diameter distribution peak in the range of 0.1 to 0.8 μm, and this catalyst is characterized by further comprising an oxide of at least one metal selected from the group consisting of manganese, cobalt, nickel, zinc, zirconium, niobium, molybdenum, tin, tantalum, lanthanum and cerium as another catalytic component. The process for removing organohalogen compounds involves the use of this catalyst.

14 Claims, 4 Drawing Sheets

CATALYST AND PROCESS FOR REMOVING ORGANOHALOGEN COMPOUNDS

This is a divisional of prior application Ser. No. 09/595,989 now abandoned.

BACKGROUND OF THE INVENTION

A. Technical Field

The present invention relates to a catalyst and a process for removing organohalogen compounds such as dioxins.

B. Background Art

Exhaust gases from incineration facilities for disposing of industrial wastes and city wastes contain trace amounts of poisonous organohalogen compounds such as dioxins, PCB and chlorophenols. Particularly, the dioxins are extremely poisonous even in very small quantities and have a serious influence on human bodies. Therefore, a technology for removing the dioxins is desired to be developed as quickly as possible.

Generally, the organohalogen compounds are chemically extremely stable. Particularly, the dioxins are substances so difficult to decompose that they are said to semipermanently remain in the world of nature. In addition, because their contents in the exhaust gases are very small, it is difficult to efficiently remove them with conventional catalysts for disposing of exhaust gases.

In consideration of these circumstances, the present applicant verified that a catalyst comprising titanium oxide was fundamentally effective, and then the applicant found that decomposition reactions of organohalogen compounds could be promoted by well diffusing dilute components of exhaust gases by improving physical properties, specifically, pore diameter distribution, and further, pore volume, of the above catalyst. On the basis of this finding, the present applicant developed the undermentioned two kinds of catalysts to file a patent application thereof (Japanese Patent Application No. 09-358146).

1) A catalyst for removing organohalogen compounds, which comprises titanium oxide and vanadium oxide as catalytic components, and has pores that includes a group of pores having a pore diameter distribution peak in the range of 0.01 to 0.05 $\mu$m and another group of pores having a pore diameter distribution peak in the range of 0.1 to 0.8 $\mu$m.

2) A catalyst for removing organohalogen compounds, which comprises titanium oxide, a titanium-silicon composite oxide, and vanadium oxide as catalytic components, and has pores that includes a group of pores having a pore diameter distribution peak in the range of 0.01 to 0.05 $\mu$m and another group of pores having a pore diameter distribution peak in the range of 0.8 to 4 $\mu$m.

These catalysts have excellent removability, but it is preferable that a catalyst for removing organohalogen compounds, which exhibits higher performances than those catalysts, appears.

SUMMARY OF THE INVENTION

A. Object of the Invention

An object of the present invention is to provide: a catalyst which has more excellent removability upon organohalogen compounds and is suitable for removing the organohalogen compounds from exhaust gases; and a process for removing organohalogen compounds with this catalyst.

B. Disclosure of the Invention

The present inventors sought for a new catalytic component to achieve the above object. As a result, they completed the present invention, relating to a catalyst for removing organohalogen compounds and a usage of this catalyst, by finding that an oxide of at least one metal selected from the group consisting of manganese, cobalt, nickel, zinc, zirconium, niobium, molybdenum, tin, tantalum, lanthanum and cerium was effective.

That is to say, a first catalyst for removing organohalogen compounds (hereinafter referred to simply as "first catalyst"), according to the present invention, comprises titanium oxide ($TiO_2$) and vanadium oxide as catalytic components, and has pores that includes a group of pores having a pore diameter distribution peak in the range of 0.01 to 0.05 $\mu$m and another group of pores having a pore diameter distribution peak in the range of 0.1 to 0.8 $\mu$m, and this catalyst is characterized by further comprising an oxide of at least one metal selected from the group consisting of manganese, cobalt, nickel, zinc, zirconium, niobium, molybdenum, tin, tantalum, lanthanum and cerium as another catalytic component.

A second catalyst for removing organohalogen compounds (hereinafter referred to simply as "second catalyst"), according to the present invention, is characterized by comprising titanium oxide ($TiO_2$), a titanium-silicon composite oxide ($TiO_2$—$SiO_2$), vanadium oxide and an oxide of at least one metal selected from the group consisting of manganese, cobalt, nickel, zinc, zirconium, niobium, molybdenum, tin, tantalum, lanthanum and cerium as catalytic components.

A process for removing organohalogen compounds, according to the present invention, comprises the step of bringing an exhaust gas into contact with either one or both of the above catalysts according to the present invention, wherein the exhaust gas contains organohalogen compounds.

These and other objects and the advantages of the present invention will be more fully apparent from the following detailed disclosure.

Figure 1:
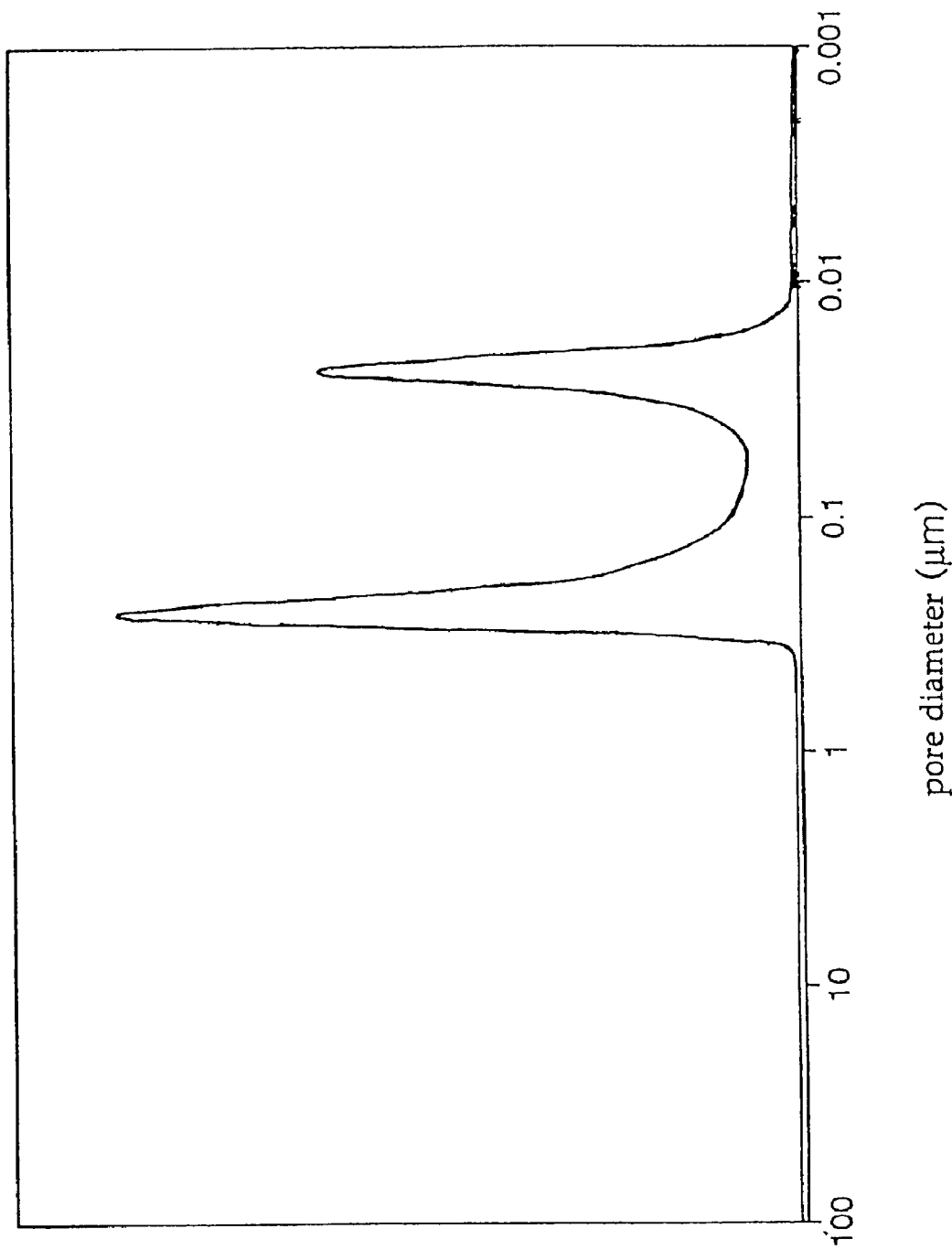
FIG. 1 shows a pore diameter distribution of catalyst A obtained in Example 1.

DETAILED DESCRIPTION OF THE INVENTION (Catalyst for Removing Organohalogen Compounds):

The first and second catalysts both comprise titanium oxide ($TiO_2$) as a main component of the catalytic components. The second catalyst further comprises a titanium—silicon composite oxide ($TiO_2$—$SiO_2$, hereinafter referred to as "Ti—Si composite oxide") as a second main component of the catalytic components.

The titanium oxide itself has a high decomposing activity upon organohalogen compounds. In addition, the Ti—Si composite oxide also has a high decomposing activity upon organohalogen compounds, and further, is excellent also in the adsorbency upon the organohalogen compounds because the Ti—Si composite oxide is amorphous and therefore has a large specific surface area and further exhibits peculiar solid acidity. It is considered that close mixing of these two kinds of oxides exhibiting properties different from each other makes synergistic effects from interaction between these oxides, with the result that a catalyst having excellent decomposability upon organohalogen compounds is formed.

The content of the Ti—Si composite oxide in the second catalyst is preferably in the range of 0.01 to 7 times by weight, more preferably 0.05 to 3 times by weight, of the titanium oxide. In the case where the content of the Ti—Si composite oxide in the second catalyst is either more or less than the above-mentioned ranges, individual properties of the titanium oxide and the Ti—Si composite oxide are merely obtained, and further, the ability to dispose of exhaust gases is deteriorated because no aimed catalytic physical property is obtained.

As to the source of the above titanium oxide, both inorganic and organic compounds as well as titanium oxide can be used if they produce titanium oxide by calcining. Examples of the usable compound include: inorganic titanium compounds such as titanium tetrachloride and titanium sulfate; and organic titanium compounds such as titanium oxalate and tetraisopropyl titanate.

As to the titanium source used for the preparation of the above Ti—Si composite oxide, any of the above-mentioned inorganic and organic compounds can be used. In addition, the silicon source can fitly be selected from the group consisting of: inorganosilicon compounds such as colloidal silica, water glass, fine particle silicon, and silicon tetrachloride; and organosilicon compounds such as tetraethyl silicate.

The above Ti—Si composite oxide, for example, can be prepared by any one of the following processes (a) to (d):

(a) A process comprising the steps of mixing silica sol with aqueous ammonia, and then adding an aqueous sulfuric acid solution of titanium sulfate to the resultant mixture to form a precipitate, which is washed, dried, and then calcined in the range of 300 to 700° C.

(b) A process comprising the step of adding an aqueous solution of sodium silicate to an aqueous solution of titanium sulfate to run a reaction therebetween to form a precipitate, which is washed, dried, and then calcined in the range of 300 to 700° C.

(c) A process comprising the steps of adding ethyl silicate (tetraethoxylsilane) to a water-alcohol solution of titanium tetrachloride, and then carrying out hydrolysis to form a precipitate, which is washed, dried, and then calcined in the range of 300 to 700° C.

(d) A process comprising the step of adding ammonia to a water-alcohol solution of titanium oxide chloride (oxytitanium trichloride) and ethyl silicate to form a precipitate, which is washed, dried, and then calcined in the range of 300 to 700° C.

Among the above-mentioned processes, the process (a) is particularly preferred. More specifically, the silicon source and aqueous ammonia are placed into a vessel such that the molar ratio therebetween will be a predetermined value, and then an acidic aqueous solution or sol which is a titanium source (acidic aqueous solution or sol having a concentration of 1 to 100 g/liter (the titanium source is calculated as $TiO_2$)) is dropwise added into the vessel which is maintained in the range of 10 to 100° C., and the resultant mixture is maintained in the pH range of 2 to 10 for from 10 minutes up to 3 hours so as to produce a coprecipitate of titanium and silicon, and this coprecipitate is filtered off, and then sufficiently washed, and then dried in the range of 80 to 140° C. for from 10 minutes up to 3 hours, and then calcined in the range of 300 to 700° C. for 1 to 10 hours, with the result that the aimed Ti—Si composite oxide can be obtained.

The first and second catalysts both comprise vanadium oxide as a first subcomponent of the catalytic components preferably in the ratio of 0.1 to 25 weight %, more preferably 1 to 15 weight %, of the aforementioned main component (the titanium oxide in the case of the first catalyst, and the total of the titanium oxide and the Ti—Si composite oxide in the case of the second catalyst), and further comprise an oxide of at least one metal selected from the group consisting of manganese, cobalt, nickel, zinc, zirconium, niobium, molybdenum, tin, tantalum, lanthanum and cerium (hereinafter referred to simply as "metal oxide") as a second subcomponent of the catalytic components preferably in the ratio of 0.1 to 25 weight %, more preferably 1 to 15 weight %, of the aforementioned main component. In the case where the content of the vanadium oxide or metal oxide is less than 0.1 weight %, effects by adding it are not sufficiently obtained. On the other hand, even if the content of the vanadium oxide or metal oxide is more than 25 weight %, the improvement of the activity is not so much recognized, and the activity might be deteriorated according to circumstances.

As to the source of the vanadium oxide or metal oxide, not only these oxides themselves, but also both inorganic and organic compounds can be used if they produce the above oxides by calcining. Examples of the usable compound include hydroxides, ammonium salts, oxalates, halides, sulfates, and nitrates containing each metal element of the above oxides.

The first catalyst comprises the above-mentioned catalytic components, and has pores that includes a group of pores having a pore diameter distribution peak in the range of 0.01 to 0.05 μm (this group of pores might hereinafter be referred to as "first group of pores") and another group of pores having a pore diameter distribution peak in the range of 0.1 to 0.8 μm (this group of pores might hereinafter be referred to as "second group of pores").

The second catalyst comprises the above-mentioned catalytic components, and preferably has pores that includes a group of pores having a pore diameter distribution peak in the range of 0.01 to 0.05 μm (this group of pores might hereinafter be referred to as "first group of pores") and another group of pores having a pore diameter distribution peak in the range of 0.8 to 4 μm (this group of pores might hereinafter be referred to as "third group of pores").

Figure 3:
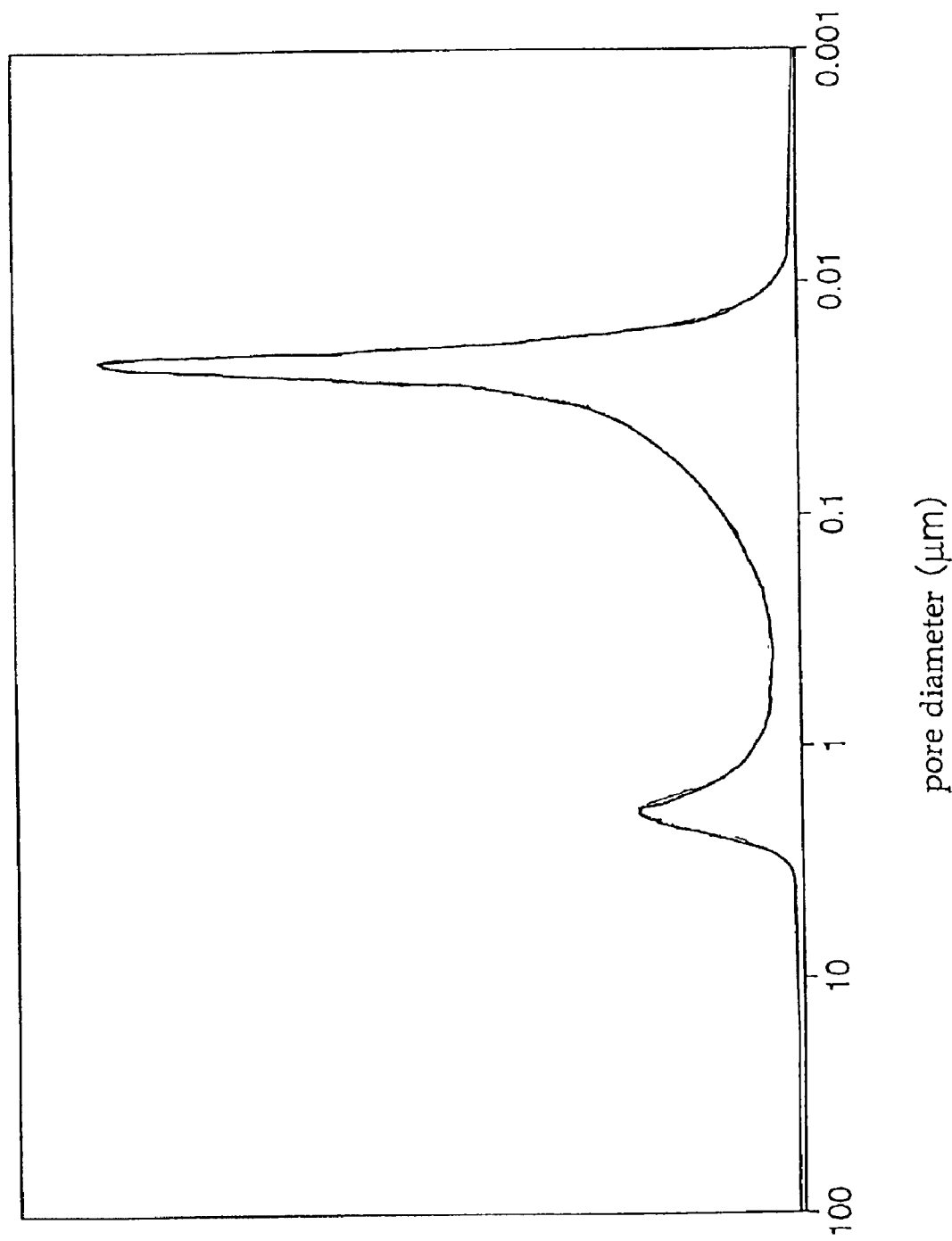
FIG. 3 shows a pore diameter distribution of catalyst C obtained in Example 2.

As is shown in FIGS. 1 and 3, the pores of the catalyst according to the present invention have two pore diameter distribution peaks which are substantially independent of each other, and further, the pore diameter distribution of each group of pores having each of the above peaks is narrow and substantially uniform. Preferably, only one pore diameter distribution peak is present in each pore diameter range. As a matter of course, the pore diameter distribution is permitted not to be substantially uniform, but to have a shoulder at the foot of its peak. However, a catalyst having pores with a substantially uniform pore diameter distribution is particularly favorably used.

Preferably, the catalyst according to the present invention has a total pore volume in the range of 0.2 to 0.6 cc/g as measured by a mercury injection method.

As to the first catalyst, preferably, the pore volume of the first group of pores is in the range of 10 to 70% of the total pore volume, and that of the second group of pores is in the range of 10 to 70% of the total pore volume. In addition, as to the second catalyst, preferably, the pore volume of the first group of pores is in the range of 20 to 80% of the total pore volume, and that of the third group of pores is in the range of 5 to 70% of the total pore volume.

The catalyst according to the present invention has an average particle diameter preferably in the range of 0.001 to 100 μm, more preferably in the range 0.01 to 100 μm.

The catalyst according to the present invention has a specific surface area preferably in the range of 30 to 250 m²/g, more preferably 40 to 200 m²/g, as measured by the BET method.

Therefore, a catalyst which is preferably used among the first catalysts comprises titanium oxide, vanadium oxide, and the metal oxide as catalytic components, and has a total pore volume in the range of 0.2 to 0.6 cc/g as measured by a mercury injection method, and further has pores that includes a group of pores having a pore diameter distribution peak in the range of 0.01 to 0.05 μm and another group of pores having a pore diameter distribution peak in the range of 0.1 to 0.8 μm, wherein the group of pores having a pore diameter distribution peak in the range of 0.01 to 0.05 μm accounts for 10 to 70% of the total pore volume, and wherein the other group of pores having a pore diameter distribution peak in the range of 0.1 to 0.8 μm accounts for 10 to 70% of the total pore volume. In addition, a catalyst which is preferably used among the second catalysts comprises titanium oxide, the Ti—Si composite oxide, vanadium oxide, and the metal oxide as catalytic components, and has a total pore volume in the range of 0.2 to 0.6 cc/g as measured by a mercury injection method, and further has pores that includes a group of pores having a pore diameter distribution peak in the range of 0.01 to 0.05 μm and another group of pores having a pore diameter distribution peak in the range of 0.8 to 4 μm, wherein the group of pores having a pore diameter distribution peak in the range of 0.01 to 0.05 μm accounts for 20 to 80% of the total pore volume, and wherein the other group of pores having a pore diameter distribution peak in the range of 0.8 to 4 μm accounts for 5 to 70% of the total pore volume.

In addition, among the above-mentioned preferable first and second catalysts, those which have a specific surface area in the range of 30 to 250 m²/g as measured by the BET method are more preferable, and further, those which have an average particle diameter in the range of 0.001 to 100 μm are more preferable.

The shape of the catalyst according to the present invention is not especially limited, but may be any desired shape selected from shapes of such as plates, wavy plates, nets, honeycombs, columns, and cylinders. In addition, the catalyst may be used in the form carried on a carrier which has a desired shape selected from shapes of such as plates, wavy plates, nets, honeycombs, columns, and cylinders, and comprises such as alumina, silica, cordierite, titania, and stainless metal.

(Preparation Process for Catalyst):

The catalyst according to the present invention can be prepared by any process. An example thereof is shown below, but the preparation process for the catalyst according to the present invention is not limited thereto.

Examples of the preparation process for the catalyst according to the present invention include a process which comprises the step of adding salts of the first and second subcomponents of the aforementioned catalytic components, or solutions of these salts, to a powder of the main component of the aforementioned catalytic components in any order. In addition, the preparation process may be a process which comprises the steps of beforehand mixing salts of the first and second subcomponents or solutions of these salts together, and then adding the resultant mixture to the powder of the main component, or may be a process which comprises the step of impregnating a molded structure of the main component with the solutions of the salts of the first and second subcomponents or with a mixture of these solutions, thereby getting the above solutions or mixture thereof carried on the molded structure.

Other examples of the preparation process for the catalyst according to the present invention include: a process which comprises the step of getting the second subcomponent of the catalytic components carried on a mixture of the main component and the first subcomponent of the catalytic components; and a process which comprises the step of getting the first subcomponent of the catalytic components carried on a mixture of the main component and the second subcomponent of the catalytic components.

In the case where the titanium oxide and the Ti—Si composite oxide, which are main components, are mixed together in the preparation process for the second catalyst, this mixing may be carried out by conventional mixing methods. For example, a powder of the titanium oxide and a powder of the Ti—Si composite oxide can be placed into a mixing machine, such as a kneader, to mix them together by stirring.

In addition, in order to easily obtain the catalyst having physical properties as specified in the present invention, each of the above preparation processes preferably further comprises the step of: (1) controlling the grinding method such that a powder of the catalyst can have an appropriate particle diameter; or (2) controlling the amounts of molding assistants, such as starch, and water, which are added in the kneading step, and further controlling the degree of kneading; or (3), in the kneading step, adding a resin which decomposes or volatilizes in the catalyst-calcining step. The catalyst may be prepared by fitly combining these steps.

A preferable step among the above steps is a step, such as steps (2) and (3) above, in which: a compound which decomposes or volatilizes in the calcining step such as molding assistants and resins (this compound is referred to as "easily decomposable compound" in the present invention) is added when preparing the catalyst, thereby allowing a predetermined amount of easily decomposable compound to be present in a not yet calcined catalyst precursor including as an essential component either one or both of titanium oxide and a substance which is formable into titanium oxide by calcining, and then this easily decomposable compound is removed by calcining in the subsequent calcining step.

Examples of the resin to be added in the kneading step in step (3) above include acetal resins, acrylic resins, methacrylic resins, phenol resins, benzoguanamine resins, and unsaturated polyester resins.

The average particle diameter of the easily decomposable compound such as resins above is preferably in the range of 5 to 1,000 μm, and the amount of the easily decomposable compound as added is preferably in the range of 0.1 to 30 wt % of the aforementioned catalyst precursor. In the case where the average particle diameter or the amount of the easily decomposable compound as added exceeds the above range, the physical properties as specified in the present invention cannot be obtained. Incidentally, in the case where the amount of the easily decomposable compound as added is too large, the mechanical strength of the resultant catalyst is low. When the catalyst is calcined, this easily decomposable compound thermally decomposes and vaporizes to leave pores behind. The thermal decomposition temperature of the easily decomposable compound is preferably in the range of 100 to 700° C., and the calorific value of the easily decomposable compound during decomposition thereof is preferably not larger than 50 kcal/g. In the case where the thermal decomposition temperature of the easily decomposable compound is higher than 700° C., the easily decomposable compound might remain unflamed after calcining the catalyst. In addition, in the case where the calorific value of the easily decomposable compound during decomposition thereof is larger than 50 kcal/g, great heat is generated in the catalyst-calcining step, and the resultant specific surface area of the catalyst is small, and further, such as sintering of active components is caused.

(Process for Removing Organohalogen Compounds):

The catalyst according to the present invention is used for removing organohalogen compounds. For example, this catalyst is also preferably used for disposing of exhaust gases, containing organohalogen compounds, from incineration facilities for disposing of industrial wastes and city wastes. This catalyst is particularly useful for disposing of exhaust gases containing at least one member (what is called dioxin) selected from the group consisting of polyhalogenated dibenzodioxins, polyhalogenated dibenzofurans and polyhalogenated biphenyls as organohalogen compounds among the above exhaust gases containing organohalogen compounds.

In order to dispose of the organohalogen compounds with the catalyst according to the present invention, this catalyst is brought into contact with the exhaust gases to decompose and thereby remove the organohalogen compounds which are contained in the exhaust gases. The conditions in this step are not especially limited, but this step can be carried out under conditions which are conventionally used for this type of reaction. Specifically, the conditions may fitly be determined in consideration of such as the type and properties of the exhaust gases and the required decomposition ratio of the organohalogen compounds.

The space velocity of the exhaust gases is usually in the range of 100 to 100,000 $Hr^{-1}$, preferably 200 to 50,000 $Hr^{-1}$ (STP). A space velocity slower than 100 $Hr^{-1}$ is so inefficient as to need too large a disposing apparatus. On the other hand, a space velocity faster than 100,000 $Hr^{-1}$ reduces the decomposition efficiency. In addition, when disposing of the exhaust gases, its temperature is preferably in the range of 130 to 450° C. In the case where the exhaust gas temperature is lower than 130° C., the decomposition efficiency is low. In the case where the exhaust gas temperature is higher than 450° C., there occur problems of such as sintering of active components.

Incidentally, the use of the present invention catalyst for removing organohalogen compounds further can simultaneously remove organohalogen compounds and nitrogen oxides by adding reductants such as ammonia into exhaust gases.

(Effects and Advantages of the Invention):

The catalyst according to the present invention has excellent removability upon organohalogen compounds and is favorably used for removing the organohalogen compounds by disposing of various exhaust gases containing the organohalogen compounds.

In addition, the catalyst according to the present invention further has excellent removability upon nitrogen oxides (NOx) (denitrifiability). Therefore, the catalyst according to the present invention is useful as a catalyst for simultaneously removing organohalogen compounds and nitrogen oxides from exhaust gases.

Organohalogen compounds can effectively be removed by the present invention process for removing organohalogen compounds, because the above catalyst is used in this process.

Detailed Description of the Preferred Embodiments

Hereinafter, the present invention is more specifically illustrated by the following examples of some preferred embodiments in comparison with comparative examples not according to the invention. However, the present invention is not limited to the below-mentioned examples.

In Example 1 and Comparative Example 1 below, the first group of pores is a group of pores having a pore diameter distribution peak within the range of 0.01 to 0.05 µm, and the second group of pores is a group of pores having a pore diameter distribution peak within the range of 0.1 to 0.8 µm. In addition, in Examples 2 and 3 and Comparative Example 2 below, the first group of pores is a group of pores having a pore diameter distribution peak within the range of 0.01 to 0.05 µm, and the third group of pores is a group of pores having a pore diameter distribution peak within the range of 0.8 to 4 µm.

EXAMPLE 1

A solution of 1.47 kg of ammonium metavanadate and 1.8 kg of oxalic acid in 5 liters of water and a solution of 2.1 kg of ammonium paramolybdate and 0.8 kg of monoethanolamine in 3 liters of water were added to 20 kg of a commercially available titanium oxide powder (DT-51 (trade name), produced by Millennium Inorganic Chemicals Limited). Then, 1 kg of phenol resin (Bellpearl (trade name), produced by Kanebo Co.) and 0.5 kg of starch (as a molding assistant) were further added to and mixed with the resulting mixture. The resulting mixture was kneaded with a kneader and then molded into a honeycomb form having an external form size of 80 mm square, an opening size of 4.0 mm, a wall thickness of 1.0 mm and a length of 500 mm with an extrusion molding machine. Thereafter, the resultant form was dried at 80° C. and then calcined at 450° C. for 5 hours under air atmosphere to obtain catalyst A.

The composition of catalyst A was $V_2O_5:MoO_3:TiO_2=$ 5:7.5:87.5 (weight ratio). The pore diameter distribution of catalyst A was measured with a mercury injection type porosimeter, with the result that the total pore volume of catalyst A was 0.40 cc/g, and that the pore volume of the first group of pores and that of the second group of pores were 34% and 57%, respectively, of the total pore volume. In addition, the specific surface area of catalyst A measured by the BET method was 73 $m^2/g$. The pore diameter distribution of catalyst A is shown in FIG. 1.

An organohalogen compound-removing activity test was carried out with catalyst A under the following conditions. Chlorotoluene (CT) was used as the organohalogen compound.

Test Conditions:

CT: 30 ppm, $O_2$: 10%, $H_2O$: 15%, $N_2$: the balance

Gas temperature: 160 to 200° C., space velocity (STP): 2,500 $Hr^{-1}$

The CT decomposition ratio was determined from the following equation.

$$\text{CT decomposition ratio (\%)} = \left[ \begin{pmatrix} \text{CT concentration at} \\ \text{inlet of reactor} \end{pmatrix} - \begin{pmatrix} \text{CT concentration at} \\ \text{outlet of reactor} \end{pmatrix} \right] \div \begin{pmatrix} \text{CT concentration at} \\ \text{inlet of reactor} \end{pmatrix} \times 100$$

The relationship between the gas temperature and the CT decomposition ratio is shown in Table 1.

Next, catalyst A was brought into contact with a refuse incinerator exhaust gas containing dioxins (hereinafter abbreviated to DXN) of about 0.5 ng-TEQ/$Nm^3$ to measure the removability upon DXN. The gas temperature was 160° C., and the space velocity (STP) was 2,000 Hr$^{-1}$. The DXN-removing ratio was determined in accordance with the following equation and, as a result, was found 97%.

$$\text{DXN-removing ratio (\%)} = \left[\left(\begin{array}{c}\text{DXN concentration at}\\ \text{inlet of reactor}\end{array}\right) - \left(\begin{array}{c}\text{DXN concentration at}\\ \text{outlet of reactor}\end{array}\right)\right] \div \left(\begin{array}{c}\text{DXN concentration at}\\ \text{inlet of reactor}\end{array}\right) \times 100$$

COMPARATIVE EXAMPLE 1

Honeycomb-form catalyst B having an external form size of 80 mm square, an opening size of 4.0 mm, a wall thickness of 1.0 mm and a length of 500 mm was prepared in the same manner as in Example 1 except that: the titanium oxide powder was further ground with an air grinder, and the phenol resin was not added in the kneading step, and a deaerating layer was provided before the molding machine to remove air from the kneaded product.

Figure 2:
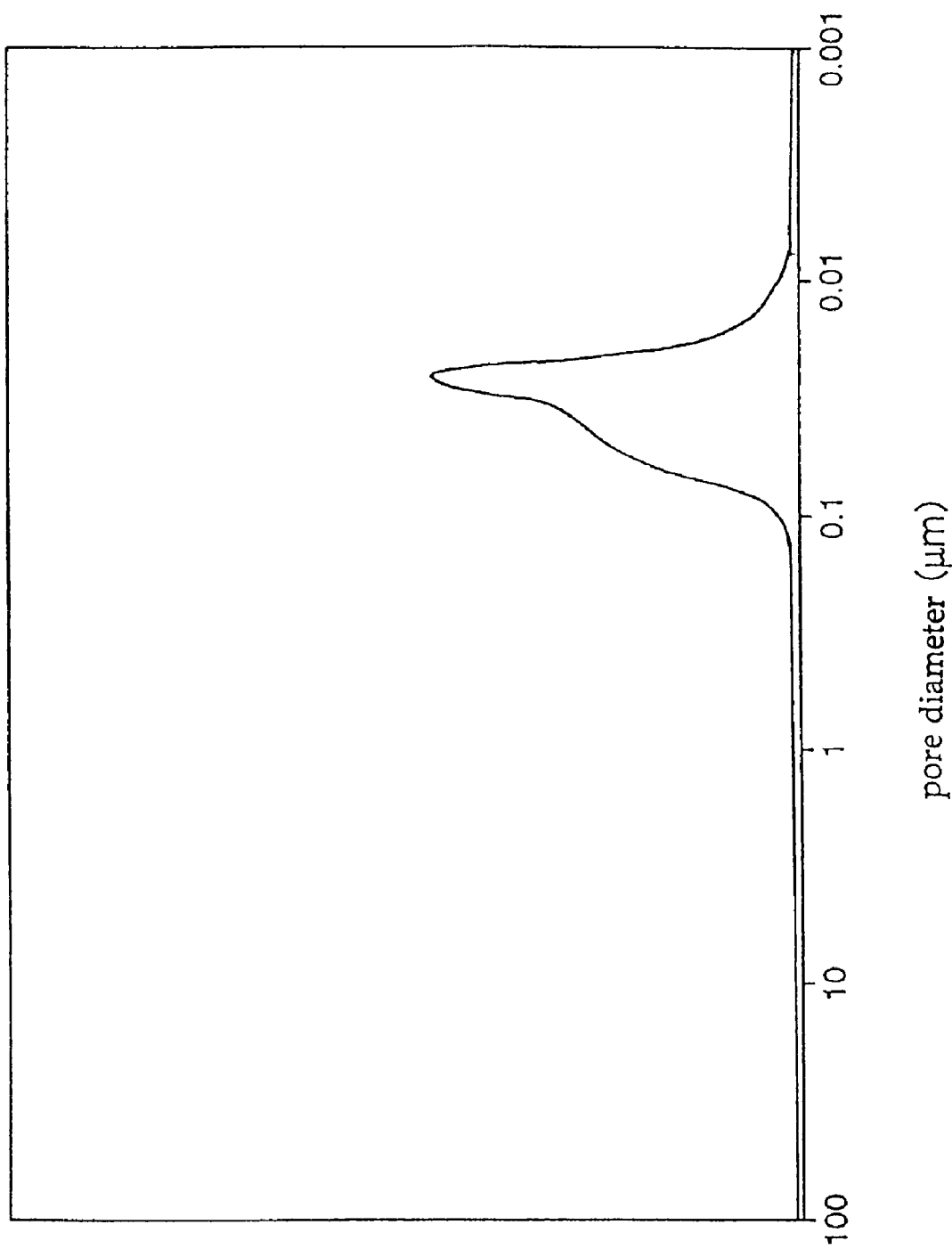
FIG. 2 shows a pore diameter distribution of catalyst B obtained in Comparative Example 1.

The pore diameter distribution of catalyst B was measured with a mercury injection type porosimeter, with the result that only the first group of pores having a pore diameter distribution peak in the range of 0.01 to 0.05 µm was found, and that the second group of pores having a pore diameter distribution peak in the range of 0.1 to 0.8 µm was absent. In addition, the total pore volume of catalyst B was 0.24 cc/g, and its specific surface area measured by the BET method was 68 m$^2$/g. The pore diameter distribution of catalyst B is shown in FIG. 2.

An organohalogen compound-removing activity test was carried out with catalyst B in the same manner as in Example 1. Results thereof are shown in Table 1.

TABLE 1

| Space velocity 2,500 Hr$^{-1}$ Catalyst | | Example 1 A | Comparative Example 1 B |
|---|---|---|---|
| Gas temperature (° C.) | 160 | 90% | 61% |
| | 180 | 98% | 83% |
| | 200 | 99% | 95% |

EXAMPLE 2

To begin with, a Ti—Si composite oxide was prepared in the following way. An amount of 21.3 kg of Snowtex-20 (silica sol with an SiO$_2$ content of about 20 wt %, produced by Nissan Chemical Industries, Ltd.) was added to 700 liters of 10 wt % ammonia water, and then they were mixed together by stirring. Thereafter, 340 liters of a sulfuric acid solution of titanyl sulfate (125 g/liter as TiO$_2$, and sulfuric acid concentration=550 g/liter) was gradually added dropwise under agitation. The resultant gel was left for 3 hours, and then filtered off, and then washed with water, and then dried at 150° C. for 10 hours. The resultant product was calcined at 500° C., and then ground with a hammer mill, and then classified with a classifier to obtain a powder having an average particle diameter of 10 µm. The composition of the resultant powder was TiO$_2$:SiO$_2$=8.5:1.5 (molar ratio). In an X-ray diffraction chart of this powder, no clear characteristic peak of TiO$_2$ or SiO$_2$ was seen, but a broad diffraction peak was seen, from which it was verified that the resultant powder was a titanium-silicon composite oxide (Ti—Si composite oxide) having an amorphous fine structure.

A solution of 1.43 kg of ammonium metavanadate, 1.7 kg of oxalic acid, and 0.4 kg of monoethanolamine in 5 liters of water and a solution of 1.36 kg of ammonium paramolybdate and 0.5 kg of monoethanolamine in 3 liters of water were added to 10 kg of the above Ti—Si composite oxide and 10 kg of a commercially available titanium oxide powder (DT-51 (trade name), produced by Millennium Inorganic Chemicals Limited). Then, 1 kg of phenol resin (Bellpearl (trade name), produced by Kanebo Co.) and 0.5 kg of starch (as a molding assistant) were further added to and mixed with the resulting mixture. The resulting mixture was well kneaded with a kneader while adding a moderate amount of water thereto. The kneaded product was molded into a honeycomb form having an external form size of 80 mm square, an opening size of 4.0 mm, a wall thickness of 1.0 mm and a length of 500 mm with an extrusion molding machine. Thereafter, the resultant form was dried at 80° C. and then calcined at 450° C. for 5 hours under air atmosphere to obtain catalyst C.

The composition of catalyst C was V$_2$O$_5$:MoO$_3$:TiO$_2$:(Ti—Si composite oxide)=5:5:45:45 (weight ratio). The pore diameter distribution of catalyst C was measured with a mercury injection type porosimeter, with the result that the total pore volume of catalyst C was 0.38 cc/g, and that the pore volume of the first group of pores and that of the third group of pores were 57% and 23%, respectively, of the total pore volume. In addition, the specific surface area of catalyst C measured by the BET method was 84 m$^2$/g. The pore diameter distribution of catalyst C is shown in FIG. 3.

An organohalogen compound-removing activity test was carried out with catalyst C under the following conditions. Chlorotoluene (CT) was used as the organohalogen compound.

Test Conditions:
CT: 30 ppm, O$_2$: 12%, N$_2$: the balance
Gas temperature: 160 to 200° C., space velocity (STP): 2,500 Hr$^{-1}$ The CT decomposition ratio was determined from the CT decomposition ratio calculation equation as set forth in Example 1. The relationship between the gas temperature and the CT decomposition ratio is shown in Table 2.

Next, catalyst C was brought into contact with a refuse incinerator exhaust gas containing DXN of about 0.5 ng-TEQ/Nm$^3$ to measure the removability upon DXN. The gas temperature was 200° C., and the space velocity (STP) was 2,000 Hr$^{-1}$. The DXN-removing ratio was determined in accordance with the DXN-removing ratio calculation equation as set forth in Example 1 and, as a result, was found 99%.

EXAMPLE 3

Honeycomb-form catalyst D having an external form size of 80 mm square, an opening size of 4.0 mm, a wall thickness of 1.0 mm and a length of 500 mm was prepared in the same manner as in Example 2 except that: the titanium oxide powder and the Ti—Si composite oxide were further ground with an air grinder, and the phenol resin was not added in the kneading step, and a deaerating layer was provided before the molding machine to remove air from the kneaded product.

Figure 4:
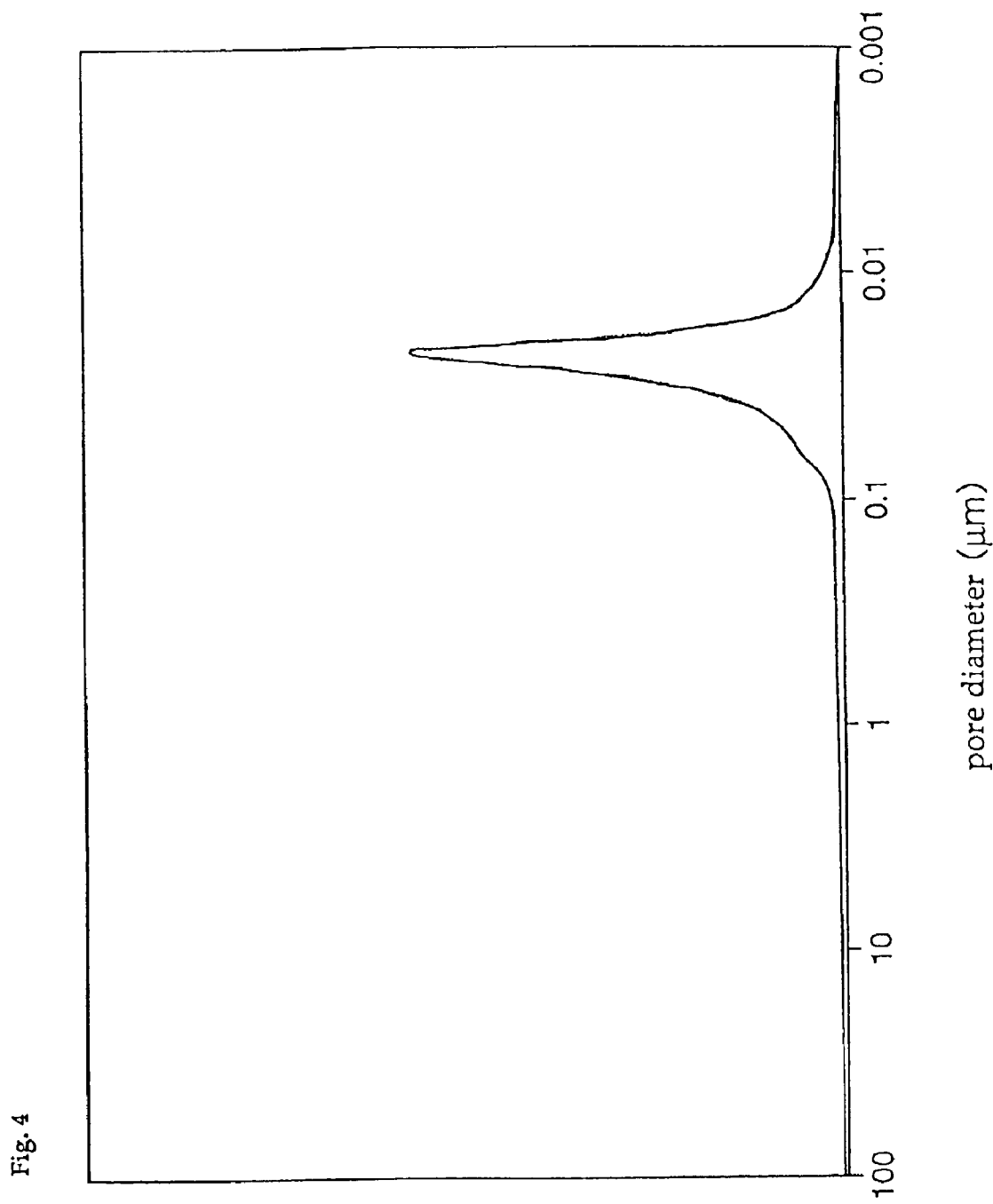
FIG. 4 shows a pore diameter distribution of catalyst D obtained in Example 3.

The pore diameter distribution of catalyst D was measured with a mercury injection type porosimeter, with the result that only the first group of pores having a pore diameter distribution peak in the range of 0.01 to 0.05 μm was found, and that the third group of pores having a pore diameter distribution peak in the range of 0.8 to 4 μm was absent. In addition, the total pore volume of catalyst D was 0.30 cc/g, and the ratio of the pore volume of the first group of pores to the total pore volume was 85%, and the specific surface area of catalyst D measured by the BET method was 78 m²/g. The pore diameter distribution of catalyst D is shown in FIG. 4.

An organohalogen compound-removing activity test was carried out with catalyst D in the same manner as in Example 2. The relationship between the gas temperature and the CT decomposition ratio is shown in Table 2.

Next, the removability upon DXN was measured with catalyst D in the same manner as in Example 2. As a result, the DXN-removing ratio was 96%.

COMPARATIVE EXAMPLE 2

Honeycomb-form catalyst E was prepared in the same manner as in Example 3 except that only the Ti—Si composite oxide was used as the titanium source.

The pore diameter distribution of catalyst E was measured with a mercury injection type porosimeter, with the result that only the first group of pores having a pore diameter distribution peak in the range of 0.01 to 0.05 μm was found, and that the third group of pores having a pore diameter distribution peak in the range of 0.8 to 4 μm was absent. In addition, the total pore volume of catalyst E was 0.35 cc/g, and the ratio of the pore volume of the first group of pores to the total pore volume was 68%, and the specific surface area of catalyst E measured by the BET method was 92 m²/g.

An organohalogen compound-removing activity test was carried out with catalyst E in the same manner as in Example 2. The relationship between the gas temperature and the CT decomposition ratio is shown in Table 2.

TABLE 2

| Space velocity 2,500 Hr⁻¹ Catalyst | Example 2 C | Example 3 D | Comparative Example 2 E |
|---|---|---|---|
| Gas temperature (° C.) 160 | 91% | 65% | 51% |
| 180 | 98.5% | 85% | 73% |
| 200 | 99.3% | 96.2% | 89% |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for removing organohalogen compounds, which comprises the step of bringing an exhaust gas into contact with a catalyst, wherein the exhaust gas contains organohalogen compounds, and wherein the catalyst comprises titanium oxide and vanadium oxide as catalytic components, and has pores that include a group of pores having a pore diameter distribution peak in the range of 0.01 to 0.05 μm and another group of pores having a pore diameter distribution peak in the range of 0.1 to 0.8 μm, with the catalyst further comprising an oxide of at least one metal selected from the group consisting of manganese, cobalt, nickel, zinc, zirconium, niobium, molybdenum, tin, tantalum, lanthanum and cerium as another catalytic component.

2. A process according to claim 1, wherein the catalyst has a total pore volume in the range of 0.2 to 0.6 cc/g as measured by a mercury injection method, wherein the group of pores having a pore diameter distribution peak in the range of 0.01 to 0.05 μm accounts for 10 to 70% of the total pore volume, and wherein the other group of pores having a pore diameter distribution peak in the range of 0.1 to 0.8 μm accounts for 10 to 70% of the total pore volume.

3. A process according to claim 1, wherein the vanadium oxide has a content in the range of 0.1 to 25 weight % of the titanium oxide, and wherein the oxide of at least one metal selected from the group consisting of manganese, cobalt, nickel, zinc, zirconium, niobium, molybdenum, tin, tantalum, lanthanum and cerium has a content in the range of 0.1 to 25 weight % of the titanium oxide.

4. A process according to claim 2, wherein the vanadium oxide has a content in the range of 0.1 to 25 weight % of the titanium oxide, and wherein the oxide of at least one metal selected from the group consisting of manganese, cobalt, nickel, zinc, zirconium, niobium, molybdenum, tin, tantalum, lanthanum and cerium has a content in the range of 0.1 to 25 weight % of the titanium oxide.

5. A process for removing organohalogen compounds, which comprises the step of bringing an exhaust gas into contact with a catalyst, wherein the exhaust gas contains organohalogen compounds, and wherein the catalyst comprises titanium oxide, a titanium-silicon composite oxide, vanadium oxide and an oxide of at least one metal selected from the group consisting of manganese, cobalt, nickel, zinc, zirconium, niobium, molybdenum, tin, tantalum, lanthanum and cerium as catalytic components, wherein the catalyst has pores that include a group of pores having a pore diameter distribution peak in the range of 0.01 to 0.05 μm and another group of pores having a pore diameter distribution peak in the range of 0.8 to 4 μm.

6. A process according to claim 5, wherein the catalyst has a total pore volume in the range of 0.2 to 0.6 cc/g as measured by a mercury injection method, wherein the group of pores having a pore diameter distribution peak in the range of 0.01 to 0.05 μm accounts for 20 to 80% of the total pore volume, and wherein the other group of pores having a pore diameter distribution peak in the range of 0.8 to 4 μm accounts for 5 to 70% of the total pore volume.

7. A process according to claim 5, wherein the titanium-silicon composite oxide has a content in the range of 0.01 to 7 times by weight of the titanium oxide.

8. A process according to claim 6, wherein the titanium-silicon composite oxide has a content in the range of 0.01 to 7 times by weight of the titanium oxide.

9. A process according to claim 5, wherein the vanadium oxide has a content in the range of 0.1 to 25 weight % of the total of the titanium oxide and the titanium-silicon composite oxide, and wherein the oxide of at least one metal selected from the group consisting of manganese, cobalt, nickel, zinc, zirconium, niobium, molybdenum, tin, tantalum, lanthanum and cerium has a content in the range of 0.1 to 25 weight % of the total of the titanium oxide and the titanium-silicon composite oxide.

10. A process according to claim 6, wherein the vanadium oxide has a content in the range of 0.1 to 25 weight % of the total of the titanium oxide and the titanium-silicon composite oxide, and wherein the oxide of at least one metal selected from the group consisting of manganese, cobalt, nickel, zinc, zirconium, niobium, molybdenum, tin, tantalum, lanthanum and cerium has a content in the range of 0.1 to 25 weight % of the total of the titanium oxide and the titanium-silicon composite oxide.

11. A process according to claim 7, wherein the vanadium oxide has a content in the range of 0.1 to 25 weight % of the total of the titanium oxide and the titanium-silicon composite oxide, and wherein the oxide of at least one metal selected from the group consisting of manganese, cobalt, nickel, zinc, zirconium, niobium, molybdenum, tin, tantalum, lanthanum and cerium has a content in the range of 0.1 to 25 weight % of the total of the titanium oxide and the titanium-silicon composite oxide.

12. A process according to claim 8, wherein the vanadium oxide has a content in the range of 0.1 to 25 weight % of the total of the titanium oxide and the titanium-silicon composite oxide, and wherein the oxide of at least one metal selected from the group consisting of manganese, cobalt, nickel, zinc, zirconium, niobium, molybdenum, tin, tantalum, lanthanum and cerium has a content in the range of 0.1 to 25 weight % of the total of the titanium oxide and the titanium-silicon composite oxide.

13. A process for removing organohalogen compounds, which comprises the step of bringing an exhaust gas into contact with a catalyst, wherein the exhaust gas contains organohalogen compounds, and wherein the catalyst comprises titanium oxide, a titanium-silicon composite oxide, vanadium oxide and an oxide of at least one metal selected from the group consisting of manganese, cobalt, nickel, zinc, zirconium, niobium, molybdenum, tin, tantalum, lanthanum and cerium as catalytic components, wherein the vanadium oxide has a content in the range of 0.1 to 25 weight % of the total of the titanium oxide and the titanium-silicon composite oxide, and wherein the oxide of at least one metal selected from the group consisting of manganese, cobalt, nickel, zinc, zirconium, niobium, molybdenum, tin, tantalum, lanthanum and cerium has a content in the range of 0.1 to 25 weight % of the total of the titanium oxide and the titanium-silicon composite oxide.

14. A process for removing organohalogen compounds, which comprises the step of bringing an exhaust gas into contact with a catalyst, wherein the exhaust gas contains organohalogen compounds, and wherein the catalyst comprises titanium oxide, a titanium-silicon composite oxide, vanadium oxide and an oxide of at least one metal selected from the group consisting of manganese, cobalt, nickel, zinc, zirconium, niobium, molybdenum, tin, tantalum, lanthanum and cerium as catalytic components, wherein the titanium-silicon composite oxide has a content in the range of 0.01 to 7 times by weight of the titanium oxide, wherein the vanadium oxide has a content in the range of 0.1 to 25 weight % of the total of the titanium oxide and the titanium-silicon composite oxide, and wherein the oxide of at least one metal selected from the group consisting of manganese, cobalt, nickel, zinc, zirconium, niobium, molybdenum, tin, tantalum, lanthanum and cerium has a content in the range of 0.1 to 25 weight % of the total of the titanium oxide and the titanium-silicon composite oxide.

\* \* \* \* \*